(12) United States Patent
Russ

(10) Patent No.: US 7,779,802 B2
(45) Date of Patent: Aug. 24, 2010

(54) SIMULATED CAM POSITION FOR A V-TYPE ENGINE

(75) Inventor: Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 554 days.

(21) Appl. No.: 11/776,343

(22) Filed: Jul. 11, 2007

(65) Prior Publication Data

US 2009/0013947 A1    Jan. 15, 2009

(51) Int. Cl.
*F01L 1/34* (2006.01)
(52) U.S. Cl. ............ 123/90.17; 123/90.15; 123/90.31
(58) Field of Classification Search ............. 123/90.15, 123/90.17, 90.31
See application file for complete search history.

(56) References Cited

U.S. PATENT DOCUMENTS

| 4,909,194 | A   | 3/1990  | Bauer                      |
| 6,016,789 | A   | 1/2000  | Denz et al.                |
| 6,213,067 | B1  | 4/2001  | Takahashi et al.           |
| 6,650,992 | B2* | 11/2003 | Jankovic et al. ... 701/111 |
| 6,843,214 | B1  | 1/2005  | Herrin                     |
| 6,932,034 | B2  | 8/2005  | Machida et al.             |
| 6,938,593 | B2* | 9/2005  | Magner et al. ... 123/90.16 |
| 7,086,381 | B2  | 8/2006  | Machida et al.             |

* cited by examiner

*Primary Examiner*—Zelalem Eshete
(74) *Attorney, Agent, or Firm*—Julia Voutyras; Alleman Hall McCoy Russell & Tuttle LLP

(57) ABSTRACT

A method is provided for estimating a cam shaft position of one bank of a V-type engine based on crankshaft acceleration and cam shaft position of the other bank of the engine.

18 Claims, 3 Drawing Sheets

SIMULATED CAM POSITION FOR A V-TYPE ENGINE

BACKGROUND AND SUMMARY

Variable timing of intake and exhaust valves of an internal combustion engine has been shown to improve engine performance. Variable valve timing may be achieved by a cam phaser that varies the phasing of the cam shaft with respect to the phasing of the crankshaft. A variable cam timing phaser relies on an output from a cam shaft position sensor to perform closed-loop control.

In the event of degradation of the cam shaft position sensor, the engine controller may command the cam shaft to a default phasing. As a result, the engine performance may be degraded. Further, for a V-type engine, two cam shaft position sensors are typically used one for each cam shaft in the two banks. Undesirable operation may occur even if one of the cam shaft position sensors has degraded.

The inventor herein has recognized that a cam shaft position for cylinders in one bank can be estimated based on information on a cam shaft position of cylinders in another bank and engine operating conditions. In one embodiment, an internal combustion engine is provided. The internal combustion engine comprises a crankshaft; a crankshaft position sensor; a first group cylinders and a second group cylinders; a first cam shaft associated with the first group; a first cam shaft position sensor in the first group; a first variable cam timing phaser coupled to said first cam shaft; a second cam shaft associated with the second group; a second variable cam timing phaser coupled to said second cam shaft; and a controller configured to adjust the second variable cam timing phaser based on the first cam shaft position sensor and acceleration of the crankshaft correlated to the first and second cylinder groups wherein the acceleration of the crankshaft is measured by the crankshaft position sensor.

In this way, variable valve timing control of at least two cam shafts may be performed in the event of degradation of one of the cam shaft position sensors, or, if a single cam shaft position sensor is present. Thus, an engine operation strategy relying on the cam shaft position can continue without being affected by degradation of one cam shaft position sensor. Furthermore, one of two cam position sensors in the V-type engine may be eliminated for cost savings or other purposes.

In another embodiment, a method for estimating a cam shaft position of a V-type internal combustion engine is provided. The engine comprises cylinders in a first bank and a second bank, a first variable cam timing phaser in the first bank, a second variable cam timing phaser in the second bank, a crankshaft position sensor, and a first cam position sensor in the first bank. The method comprises measuring average crankshaft acceleration characteristics of the cylinders in the first bank and average crankshaft acceleration characteristics of the cylinders in the second bank using the crankshaft position sensor during a power stroke; detecting a cam phasing of the first bank using the first cam position sensor; and determining a cam phasing of the second bank based on the cam phasing of the first bank and the average acceleration characteristics of the cylinders in the first bank and the second bank.

Again, in this way, variable valve timing control of at least two cam shafts may be performed in the event of degradation of one of the cam shaft position sensors, or, if a single cam shaft position sensor is present.

DETAILED DESCRIPTION OF THE DEPICTED EMBODIMENTS

Figure 1:
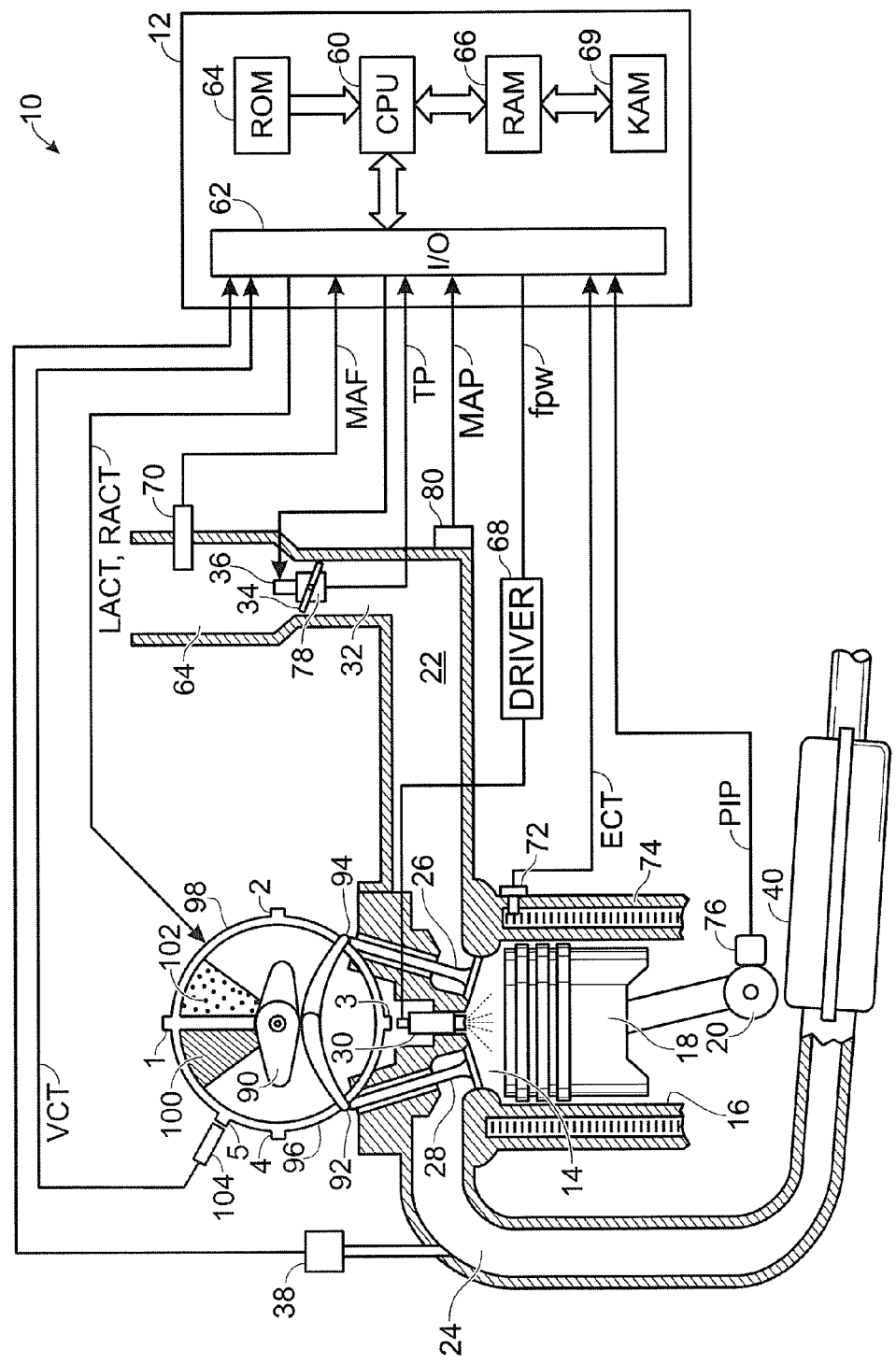
FIG. 1 is a schematic depiction of an example embodiment of an internal combustion engine.

FIG. 1 shows, generally at 10, an example embodiment of one cylinder of a multi-cylinder engine, intake and exhaust paths connected to that cylinder, and an example embodiment of a cam shaft having a variable timing mechanism for controlling the valves of the cylinder. It will be appreciated that the configuration of engine 10 is shown merely for purpose of example, and that the systems and methods described herein may be implemented in any other suitable engine. Further, the engine may be spark ignited via a spark plug located in the cylinder (not shown), the timing of which may be varied with operating conditions.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel directly therein in proportion to the fuel pulse width (fpw) signal received from controller 12 via conventional electronic driver 68. Fuel is delivered to fuel injector 30 by a gasseous fuel system (not shown) including a fuel tank, fuel pumps, and a fuel rail.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Aftertreatment device 40 may include any suitable type of device for reducing emissions from engine 10. Examples include, but are not limited to, three-way and four-way catalytic converters, particulate filters, lean NOx traps, etc.

Controller 12 is shown in FIG. 1 as a conventional microcomputer, including microprocessor unit 60, input/output ports 62, an electronic storage medium for storing programs and calibration values (shown as read only memory 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and manifold absolute pressure (MAP) signal from sensor 80.

Engine 10 may be configured to have variable intake valve and exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a cam shaft. In the depicted embodiment, cam shaft 90 of engine 10 is shown communicating with rocker arms 92 and 94 for actuating intake valve 26 and exhaust valve 28. Cam shaft 90 is directly coupled to housing 96. Housing 96 forms a toothed wheel having a plurality of teeth 98. Housing 96 is hydraulically coupled to an inner driving member (not shown), which is in turn directly linked to crankshaft 20 via a timing chain (not shown). Therefore, housing 96 and cam shaft 90 rotate at a speed substantially equivalent to the inner driving member. The inner driving member rotates at a constant speed ratio to crankshaft 20. However, by manipulation of the hydraulic coupling as will be described later herein, the relative position of cam shaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between cam shaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between cam shaft 90 and crankshaft 20 is retarded. Thus, intake valve 26 and exhaust valve 28 open and close at a time later than normal relative to crankshaft 40.

Teeth 98, being coupled to housing 96 and cam shaft 90, allow for measurement of relative cam position via cam position sensor 104 providing variable cam shaft timing (VCT) signal to controller 12. In the depicted embodiment, four teeth (labeled 1, 2, 3, and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

Relative cam timing may be measured using the method described in U.S. Pat. No. 5,548,995, which is incorporated herein by reference. In general terms, the time, or rotation angle between the rising edge of the PIP signal and receiving a signal from one of the plurality of teeth 98 on housing 96 gives a measure of the relative cam timing.

It will be understood that FIG. 1 merely shows one cylinder of a multi-cylinder engine, and that each cylinder has its own set of intake/exhaust valves, fuel injectors, etc. Further, it should be noted that the multiple cylinders may be arranged in one or more banks of the engine, such as V-type bank of the engine.

It will further be understood that the depicted engine 10 is shown only for the purpose of an example, and that the systems and methods described herein may be implemented in or applied to any other suitable engine having any suitable components and/or arrangement of components. For example, intake valve 26 and exhaust valve 28 may be electromechanically actuated, and cam shaft 90 (and various associated parts) may be omitted. Likewise, separate cam shafts may be used to control the opening of intake valve 26 and exhaust valve 28. Where each valve is operated by a separate cam shaft, each cam shaft may include a variable timing mechanism such as that shown for cam shaft 90 in FIG. 1 to allow the exhaust valve timing to be varied independent of the intake valve timing, and vice versa, via a variable cam timing system.

Note that the control and estimation routines described herein can be used with various engine configurations, such as those described above. The specific routine described herein may represent one or more of any number of processing strategies such as event-driven, interrupt-driven, multi-tasking, multi-threading, and the like. As such, various illustrated steps or functions may be performed in the sequence illustrated, in parallel, or in some cases may be omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 2:
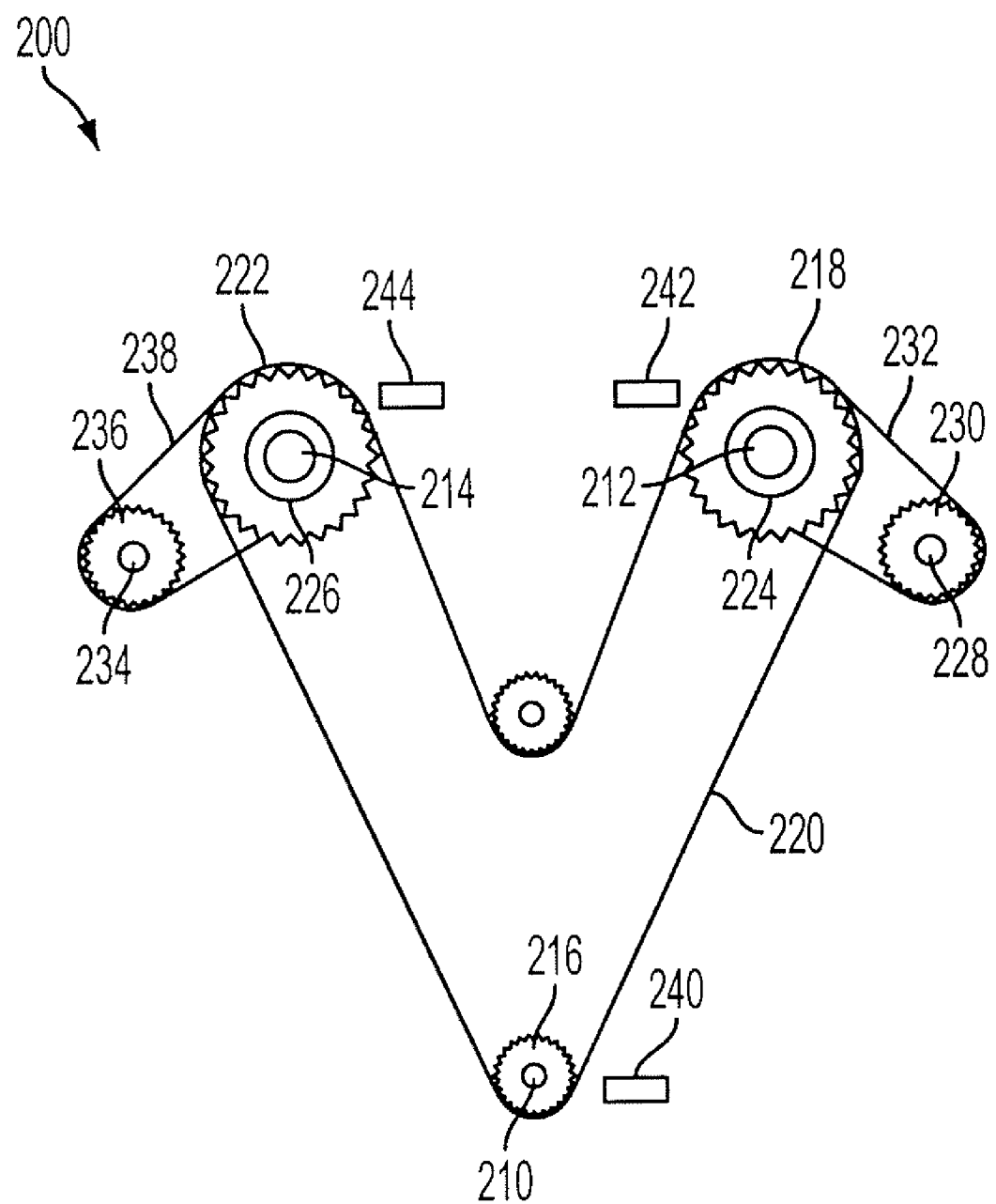
FIG. 2 is a schematic depiction of an embodiment of a crankshaft and cam phase system of an internal combustion engine having a V-type bank.

FIG. 2 is a schematic depiction of an embodiment of a crankshaft and cam shaft system 200 of an internal combustion engine having a V-type bank. As shown in FIG. 2, crankshaft and cam shaft system 200 comprises a crankshaft 210, a first cam shaft 212 in a first bank of the engine, and a second cam shaft 214 in a second bank of the engine. Crankshaft 210 is mechanically communicating with first cam shaft 212 through coupling of a sprocket 216 and a sprocket 218 by a first chain 220. Crankshaft 210 is also mechanically communicating with second cam shaft 214 through coupling of sprocket 216 and a sprocket 222 by first chain 220. As described above with reference to FIG. 1, crankshaft 210 is connected to the pistons of the engine 10. The work produced through combustion in the cylinders drives crankshaft 210 which in turn drives first cam shaft 212 and second cam shaft 214. First cam shaft 212 may be used to actuate valves of cylinders in the first bank and second cam shaft 214 may be used to actuate valves of cylinders in the second bank.

The cam shaft and crankshaft may rotate at a constant speed ratio. In some embodiments, the relative position of first cam shaft 212 to crankshaft 210 may be varied by a first cam phaser 224 mounted on sprocket 218 and the relative position of second cam shaft 214 to crankshaft 210 may be varied by a second cam phaser 226 coupled with sprocket 222. In some embodiments, first cam phaser 224 and second cam phaser 226 may be configured to both drive its corresponding cam shaft and alter its phase relation with crankshaft 210. In some embodiments, first cam phaser 224 and second cam phaser 226 may include an advance chamber and a retard chamber to vary the cam phase or the valve timing as described in FIG. 1. It should be appreciated that any suitable variable valve timing mechanisms may be used.

In some embodiments, two cams may be used to actuate the intake valve and exhaust valve of a cylinder separately (i.e., dual overhead cam configuration). In the depicted embodiment, first cam shaft 212 and second cam shaft 214 may be used to drive intake cams that actuate intake valves. Separate exhaust cams may be used to actuate the exhaust valves through mechanical communication with the cam shaft. For example, for the cylinders in the first bank, a exhaust cam 228 may be coupled with first cam shaft 212 through a sprocket 230 and sprocket 218 by a second chain 232. For the cylinders in the second bank, exhaust cam 234 may be coupled with second cam shaft 214 through a sprocket 236, sprocket 222, and a second chain 238. Alternatively, one cam may be used to drive both intake valve and exhaust valve of a cylinder (i.e., single overhead cam configuration) as described above with reference to FIG. 1 (e.g., rocker arms may be used for actuating both an intake valve and an exhaust valve). It should be appreciated that any suitable cam configuration may be employed to vary the valve timing.

In a V-type engine with the variable cam shaft timing, a first cam shaft position sensor for a first cam shaft, a second cam shaft position sensor for a second cam shaft and a crankshaft position sensor are typically used to determine the relative positions of first cam shaft 212, second cam shaft 214, and the crankshaft 210. The crankshaft position may be measured by a crankshaft position sensor 240. The cam position or cam phasing in the first bank and in the second bank may be measured by a first cam shaft position sensor 242 and a second cam shaft position sensor 244, respectively. Crankshaft position sensor 240 may be a Hall effect sensor comprising magnets and inductive coils. The Hall effect sensor produces a predetermined number of equally spaced pulses every revolution of the crankshaft. As such, the crankshaft speed or engine speed (RPM) can be determined from the frequency of the pulses. It should be appreciated that any suitable crankshaft sensor may be used to measure the crankshaft speed.

First cam shaft position sensor 242 and second cam shaft position sensor 244 may include sensors with operating mechanisms similar to those of crankshaft position sensor, such as a Hall effect sensor, etc. It should be appreciated that any suitable cam shaft position sensor may be used to measure the position of the cam.

Figure 3:
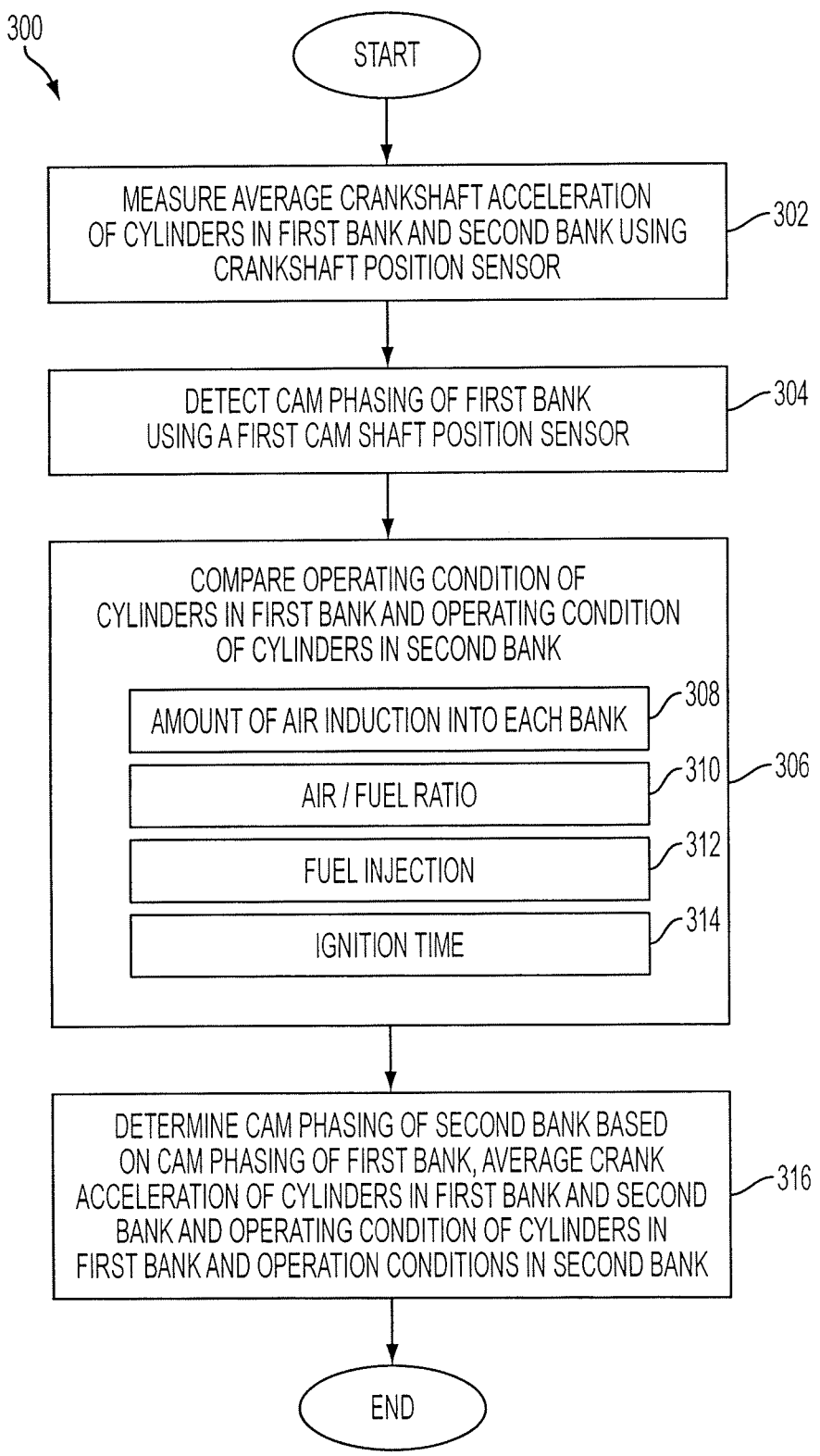
FIG. 3 shows a flow diagram depicting an example method or routine of estimating a cam shaft position of a V-type internal combustion engine.

FIG. 3 shows, generally at 300, a flow diagram depicting an example method for estimating a cam shaft position of a V-type internal combustion engine. Because there are two revolutions of the crankshaft for every revolution of the cam shaft, both cam shaft position sensor and crankshaft sensor are used to determine the position of the cam shaft and the crankshaft. For a V-type engine, separate cam shaft position sensors are generally used to determine the cam phasing in each bank. However, degraded operation may occur if one of the cam shaft position sensors provides degraded sensor information. However, the cam shaft position or cam phasing of one bank can be estimated or simulated based on the cam shaft position of another bank, crankshaft position of the engine, and an operating condition using method 300. Specifically, at 302, method 300 includes measuring an average crankshaft acceleration of cylinders or average crankshaft acceleration characteristics of cylinders in a first bank and a second bank using a crankshaft position sensor. The work produced by the ignition of a mixture of fuel and air in a given cylinder results in an acceleration of the crankshaft during the power stroke. The average crankshaft acceleration of the cylinders may be determined from the crankshaft speed.

Next, at 304, method 300 includes detecting a cam phasing of the first bank using a first cam position sensor in the first bank. As described above, any suitable cam position sensor may be used to measure the cam position or the cam phasing.

Next, at 306, method 300 includes comparing an operating condition of cylinders in the first bank and an operating condition of cylinders in the second bank. The cam phasing or valve timing of the cylinders controls the operation of cylinders in the engine. The operating condition of the cylinders in turn reflects the cam phasing. Thus, the operating condition may be used to estimate or simulate the cam phasing of cylinders in one bank together with known cam phasing of cylinders in another bank and information on the crankshaft position. In some embodiments, the operating conditions include, but are not limited to, an amount of air induction into each bank, air/fuel ratio, fuel injection, or ignition time as indicated in 308, 310, 312, and 314, respectively.

Next, at 316, method 300 includes determining a cam phasing of the second bank based on the cam phasing of the first bank, the average crankshaft acceleration of cylinders in the first bank and the average crankshaft acceleration of cylinders in the second bank, and the operating condition of cylinders in the first bank and the operating condition of the cylinders in the second bank. Since both cam shaft in the first bank and cam shaft in the second bank are driven by the crankshaft, the cam phasing of cylinders in each bank correlates with the crankshaft speed or acceleration. Further, the crankshaft acceleration relates to the operating condition of the engine. Thus, the cam phasing in the second bank correlates to the cam phasing in the first bank, the average acceleration of the crankshaft in each bank and the operating condition.

Various approaches may be used to make such determination. For example, the cam phasing of cylinders in the second bank may be determined by the following equation:

$$\text{Cam Phasing in First Bank} = \text{Measured Cam Phasing in Second Bank} + f(CA1, CA2, AF1, AF2, SPK1, SPK2, MAF1, MAF2)$$

where CA1 is the crankshaft acceleration in the first bank, CA2 is the crankshaft acceleration in the second bank, AF1 is the air/fuel ratio in the first bank, AF2 is the air/fuel ratio in the second bank, SPK1 is the spark timing in the first bank, SK2 is the spark timing in the second bank, MAF1 is the airflow rate in the first bank, and MAF2 is the airflow rate in the second bank.

As shown in the above equation, the relative position of cam phasing in the first bank and second bank is a function of crankshaft acceleration in each bank and the operating conditions. In some embodiments, an engine map may be developed to establish relationships among the cam phasing of cylinders in the second bank with the cam phasing of cylinders in the first bank, average acceleration of cylinders in the first bank and the second bank, and operating variables such as the amount of air induction or airflow rate, air/fuel ratio, spark timing, fuel injection, etc. Thus, the cam phasing of cylinders in the second bank at a specific time may be determined by finding the corresponding variables such as, cam phasing in the first bank, crankshaft accelerations or crankshaft acceleration characteristics in the first and second bank, amount of air induction in the first bank and the second bank, air/fuel ratio, spark timing, fuel injection, etc.

In some embodiments, a simple algorithm may be used to determine the cam phasing of cylinders in the second bank. For example, if the average acceleration of cylinders in the first bank and the average acceleration of cylinders in the second bank are substantially the same, the cam phasing of the second bank may be substantially identical to the cam phasing of the first bank. If the average acceleration of cylinders in the first bank is different from the average acceleration of cylinders in the second bank, the cam phasing in two banks may be different. The difference may be due to operating conditions in cylinders in both banks. At some conditions, the cam phasing in the second bank may correlate directly to one or more operating variables as described in detail below.

Specifically, the cam phasing in the second bank may be directly proportional to the amount of air induction into the cylinders in the first bank and the second bank at controlled operating conditions. The controlled operating condition may include air/fuel ratio in each bank. The air/fuel ratio may be controlled to a predetermined value by the engine controller. In some embodiments, the controller may adjust the air/fuel ratio to operate the engine at stoichiometric air/fuel ratio. In some embodiments, the controller may adjust the air/fuel ratio to operate the engine lean or rich. The controlled operating condition may also include spark timing or ignition timing. Further the controlled operating condition may include fuel injection.

Alternatively, the cam phasing in the second bank may be directly proportional to the amount of air induction into the cylinders in the first bank and the second bank at predetermined operating conditions. For example, the air/fuel ratio of cylinders in each bank may be determined from a measurement by an air/fuel ratio sensor. Further, the fuel injection timing and the amount of fuel injected into the cylinders may be determined by the controller. Furthermore, the spark timing or ignition timing may be determined by the controller.

At the predetermined or controlled operating condition, the amount of air inducted into the cylinders in each bank may indicate the relative positions of cam phasing in two banks. For example, the cam phasing of the second bank may be determined to be advanced compared to the cam phasing of the first bank in the direction of a higher air induction if the average crankshaft acceleration characteristics of the cylinders in the second bank is greater than the average crankshaft acceleration characteristics of the cylinders in the first bank. Likewise, the cam phasing of the second bank may be determined to be retarded compared to the cam phasing of the first bank in the direction of a lower air induction if the average crankshaft acceleration characteristics of the cylinders in the second bank is less than the average crankshaft acceleration characteristics of cylinders in the first bank.

The amount of air induction into the cylinders of the first bank and the second bank may be determined by information from any suitable sensors such as mass air flow sensor 70 shown in FIG. 1. Alternatively, the amount of air induction may be determined from the engine operating parameters.

In this way, the cam phasing in the second bank may be determined from the cam phasing in the first bank, the crankshaft acceleration of cylinders in the first bank and second bank, and the amount of air induction into the cylinders in the first bank and the second bank.

It should be appreciated that method 300 only illustrates an example approach to determine a cam phasing of one bank based on the information from cam phasing of another bank, crankshaft position, and operation conditions. It should be appreciated that any suitable method may be used to simulate the cam phasing of one bank based on available information such as information from available sensors and engine operation conditions.

The method described above can determine a cam phasing of one bank based on the information from cam phasing in another bank and the operating conditions in each bank. In this way, the normal variable valve timing operation based on two cam shaft position sensors can still be performed without default to a less optimal operating condition in the event of degradation of one cam position sensor. Furthermore, one of two cam position sensors in the V-type engine may be eliminated for cost savings or other purposes.

It may be appreciated that the order of processing to be detailed is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

Furthermore, it will be appreciated that the various embodiments of methods of estimating a cam position disclosed herein are exemplary in nature, and these specific embodiments are not to be considered in a limiting sense, because numerous variations are possible. The subject matter of the present disclosure includes all novel and non-obvious combinations and subcombinations of the various methods, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
   a crankshaft;
   a crankshaft position sensor;
   a first group of cylinders and a second group of cylinders;
   a first cam shaft associated with the first group;
   a first cam shaft position sensor in the first group and no cam shaft position sensor in the second group;
   a first variable cam timing phaser coupled to said first cam shaft;
   a second cam shaft associated with the second group;
   a second variable cam timing phaser coupled to said second cam shaft; and
   a controller configured to adjust the second variable cam timing phaser based on the first cam shaft position sensor and acceleration of the crankshaft correlated to the first and second cylinder groups where the acceleration of the crankshaft is measured by the crankshaft position sensor.

2. The engine of claim 1, wherein the controller further estimates a cam phasing in the second group based on information from the first cam shaft position sensor, the crankshaft position sensor, and a difference between an average crankshaft acceleration of the first group cylinders and an average crankshaft acceleration of the second group cylinders, and an operating condition in the first cylinder group and in the second cylinder group, where the first cylinder group is in a first bank and the second cylinder group is in a second bank arranged in a V-engine.

3. The engine of claim 2, wherein the average crankshaft acceleration in the first bank and the second bank is determined by crankshaft speeds measured by the crankshaft position sensor.

4. The engine of claim 2, wherein the operation conditions comprise one or more of an airflow rate, an air/fuel ratio, spark timing, and fuel injection of the first group cylinders in the first bank and the second group cylinders in the second bank.

5. The engine of claim 1, wherein the controller correlates based on power strokes of the cylinders.

6. The engine of claim 1, wherein the first group cylinders and the second group cylinders are mutually exclusive.

7. A method for estimating a cam shaft position of a V-type internal combustion engine, the engine comprising cylinders in a first bank and a second bank, a first variable cam timing phaser in the first bank, a second variable cam timing phaser in the second bank, a crankshaft position sensor, and a first cam position sensor in the first bank, the method comprising:

measuring average crankshaft acceleration characteristics of the cylinders in the first bank and average crankshaft acceleration characteristics of the cylinders in the second bank using the crankshaft position sensor during a power stroke;

detecting a cam phasing of the first bank using the first cam position sensor; and determining a cam phasing of the second bank based on the cam phasing of the first bank and the average acceleration characteristics of the cylinders in the first bank and the second bank, wherein determining the cam phasing of the second bank further comprises controlling an air/fuel ratio to a predetermined value; and determining an amount of air inducted into the cylinders in the first bank and an amount of air inducted into the cylinders in the second bank.

8. The method of claim 7, wherein the cam phasing of the second bank is determined to be substantially the same as the cam phasing of the first bank if the average crankshaft acceleration characteristics of the cylinders in the first bank and the average crankshaft acceleration characteristics of the cylinders in the second bank are substantially the same.

9. The method of claim 7, wherein the cam phasing of the second bank is determined to be advanced compared to the cam phasing of the first bank in the direction of a higher air induction if the average crankshaft acceleration characteristics of the cylinders in the second bank is greater than the average crankshaft acceleration characteristics of the cylinders in the first bank.

10. The method of claim 7, wherein the cam phasing of the second bank is determined to be retarded compared to the cam phasing of the first bank in the direction of a lower air induction if the average crankshaft acceleration characteristics of the cylinders in the second bank are less than the average crankshaft acceleration characteristics of the cylinders in the first bank.

11. A method for estimating a cam shaft position of a V-type internal combustion engine, the engine comprising cylinders in a first bank and a second bank, a first variable cam timing phaser in the first bank, a second variable cam timing phaser in the second bank, a first cam shaft position sensor in the first bank, and a crankshaft position sensor, the method comprising:

determining a first average crankshaft acceleration of the cylinders in the first bank and a second average crankshaft acceleration of the cylinders in the second bank using the crankshaft position sensor during a power stroke;

detecting a cam phasing of the first bank using the first cam shaft position sensor;

comparing an operating condition of the cylinders in the first bank and an operating condition of the cylinders in the second bank; and determining a cam phasing of the second bank based on the cam phasing of the first bank, a difference between the average accelerations in the first bank and the second bank, and a comparison of the operating condition of the cylinders in the first bank and the cylinders in the second bank.

12. The method of claim 11, wherein the operating condition comprises an air/fuel ratio in the first bank and an airflow rate in the second bank, and where the air/fuel ratio is controlled to a predetermined value by a controller.

13. The method of claim 11, wherein the operating condition further comprises spark timing of the cylinders in the first bank and spark timing of cylinders in the second bank.

14. The method of claim 13, wherein the spark timing is predetermined or controlled by a controller.

15. The method of claim 13, wherein the operating condition further comprises an airflow rate in the first bank and an airflow rate in the second bank.

16. The method of claim 15, wherein the cam phasing of the second bank is determined to be approximately the same as the cam phasing of the first bank if the airflow rate in the second bank is approximately the same as the airflow rate in the first bank.

17. The method of claim 15, wherein the cam phasing of the second bank is determined to be advanced compared to the cam phasing of the first bank if the airflow rate in the second bank is greater than the airflow rate in the first bank.

18. The method of claim 15 wherein the cam phasing of the second bank is determined to be retarded compared to the cam phasing of the first bank if the airflow rate in the second bank is less than the airflow rate in the first bank.

* * * * *